Figure 1:
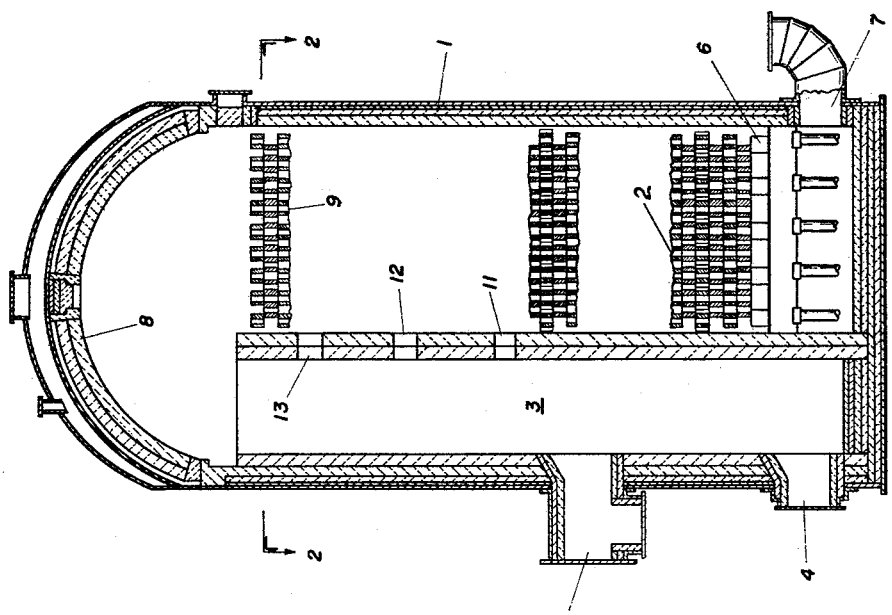

May 26, 1964      A. B. AGNEW      3,134,584

CHECKERBRICK FOR INDUSTRIAL HEATING FURNACES

Filed Aug. 21, 1961      5 Sheets-Sheet 1

INVENTOR.
Albert B. Agnew
BY William B. Jaspert
Attorney.

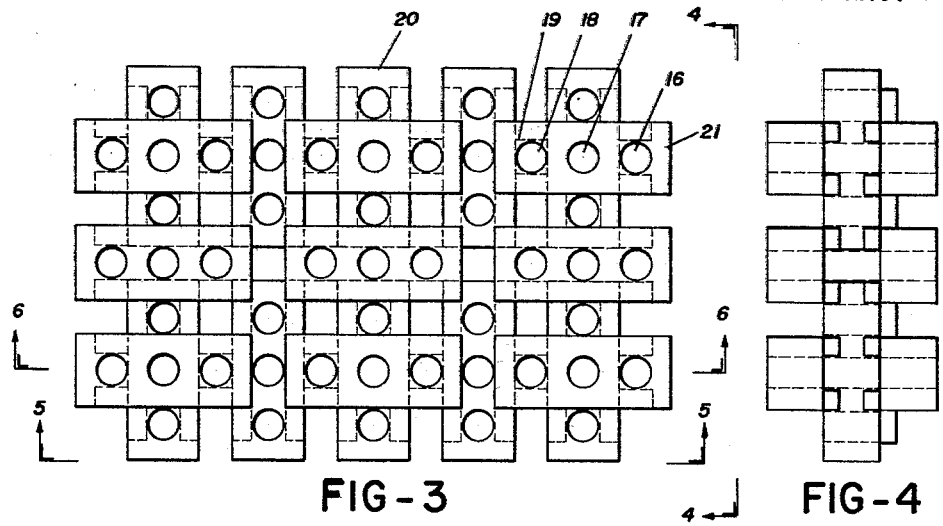
FIG-3
FIG-4
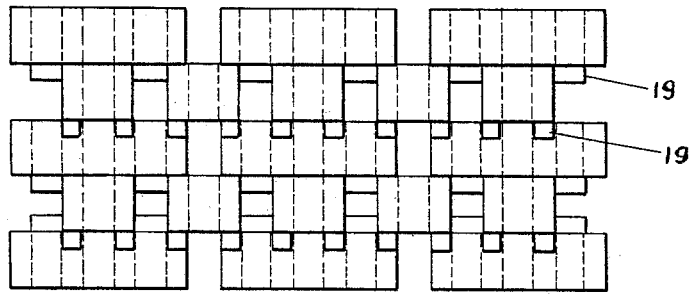
FIG-5
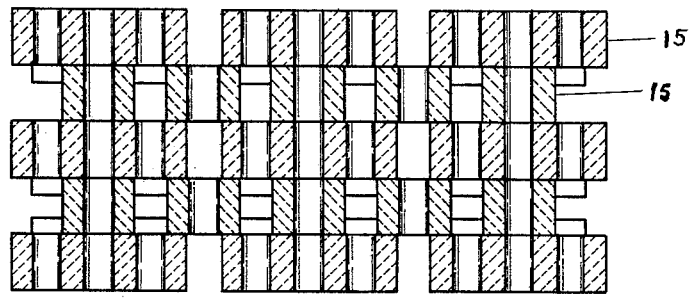
FIG-6
INVENTOR.
Albert B. Agnew
BY William B. Jaspert
Attorney INVENTOR.
Albert B. Agnew
BY William B. Jaspert
Attorney.

May 26, 1964 A. B. AGNEW 3,134,584
CHECKERBRICK FOR INDUSTRIAL HEATING FURNACES
Filed Aug. 21, 1961 5 Sheets-Sheet 5

INVENTOR.
Albert B. Agnew
BY William B. Jaspert
Attorney.

United States Patent Office 3,134,584
Patented May 26, 1964

3,134,584
CHECKERBRICK FOR INDUSTRIAL HEATING FURNACES
Albert B. Agnew, Curtis Park, Philipsburg, Pa., assignor of thirty-three and one-third percent to William B. Jaspert, Upper St. Clair Township, Pa.
Filed Aug. 21, 1961, Ser. No. 132,817
2 Claims. (Cl. 263—51)

This invention relates to new and useful improvements in checkerbrick and checkerwork construction for regenerators for hot blast stoves and the like in which fire brick surfaces are arranged for absorbing and giving off heat, and it is among the objects thereof to provide a checkerwork design which allows efficient conduction of heat to the entire mass of the checkertile in a hot blast stove or other type of regenerator and which provides for distribution of heat throughout the entire checkerwork without overheating sections thereof.

It is a further object of the invention to provide a checkerbrick which is adapted for laying up checkerwork structures with from 10 to 20% less mass and with only one shape of brick, resulting in from 10 to 20% less labor cost in the laying up of checkerwork structures.

It is still a further object of the invention to provide a checkerbrick design which is interlocked and assures alignment of the holes to form the flues in the checkerwork structure and which will prevent parting of the brick joints throughout the checkerwork sections.

It is another object of the invention to provide a checkertile of substantially brick shape having spaced holes and depending lugs which when laid up in superposed parallel rows will space the tile to form horizontal channels in alignment and in communication with the flue holes.

The checkerwork structures for blast furnace stoves constitute a mass of fire clay refractory brick or shapes of from 18 to 20 feet in cross section or diameter and 120 or more feet in height. The checkerbrick is laid in rows with adjacent brick in each row in abutting relation. There is no space for expansion and the brick is under great stress. This refractory mass is subjected to alternate heating and cooling by conducting the products from a combustion chamber adjacent the checker stove, or constituting a part of such, to the top of the refractory mass and withdrawing the same from the bottom of the checkerwork to a stack, the hot gases passing through flues provided in the refractory mass and thereby heating the refractory material. When thus heated, air is drawn into the checker stove from the bottom through the same flues through which the hot gases have passed and goes to the top of the checkerwork and into a collecting chamber from which the heated air is withdrawn for use as a hot air blast for a blast furnace or as preheated air for burners of industrial heating furnaces such as open hearths furnaces.

By thus routing the hot gases and cold air from the top and bottom, respectively, the refractory mass is subjected to expansion and contraction and particularly at the top of the stove where the entering hot gases reach temperatures of 2100°. The bottom of the refractory mass usually gets no hotter than 800° F.

The stresses thus imposed on the refractory cause it to break and crush and fall away at the top of the checkerwork thereby requiring frequent repairs and replacement.

In accordance with the present invention, these difficulties are overcome primarily because of the design of the checkertile which allows interlocking of adjacent horizontal and vertical rows of tile in all lateral directions to prevent separation of the tile and misalignment of the flue holes but permits expansion and contraction in the refractory mass. Secondly, the tile design is such that the hot gases can be admitted to the assembled mass of checkerbrick at different heights of the assembled mass to obtain a more uniform distribution of the heat to all parts of the checkerbrick structure. Also, the checkerbrick design lends itself to variation of the total mass of refractory within a given checker stove space by lengthening or shortening the interlocked lugs and correspondingly changing the thickness of the main body of the brick. This deviation in clay mass per brick also controls the degree of shrinkage in the firing of the brick so that a brick of a lesser body thickness would have less shrinkage than a brick of more body thickness which, with the present checkerbrick design, eliminates the grinding necessary on the conventional checkerbrick to obtain the degree of accuracy required in laying up and stacking the checkerwork.

Because of the horizontal flues or spaces between adjacent rows of brick, greater areas of brick surfaces are alternately exposed to the hot gases and cold air. This requires less refractory mass in the checkerwork structure. Where, because of the increased flue areas the hot gases pass too freely from the top to the bottom of the checkerwork, blocking or damper courses of different shaped brick may be used. This will prevent overheating of the metal work at the bottom of the checkerwork and allow the heat to be distributed uniformly throughout the refractory material between the blocking courses.

Figure 2:
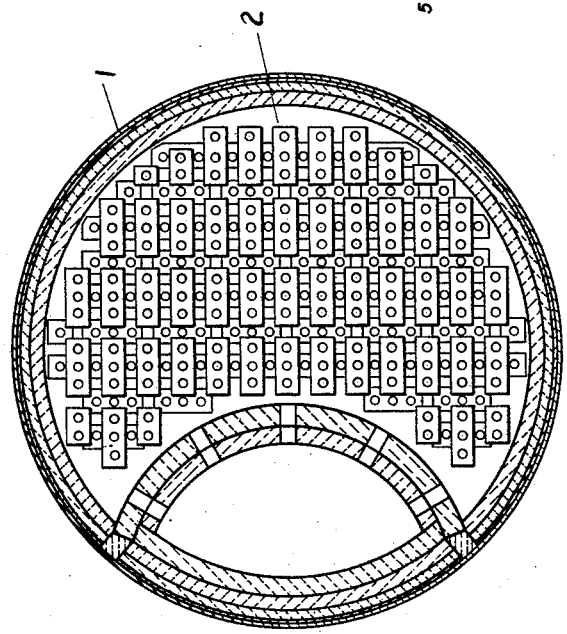
Figure 7:
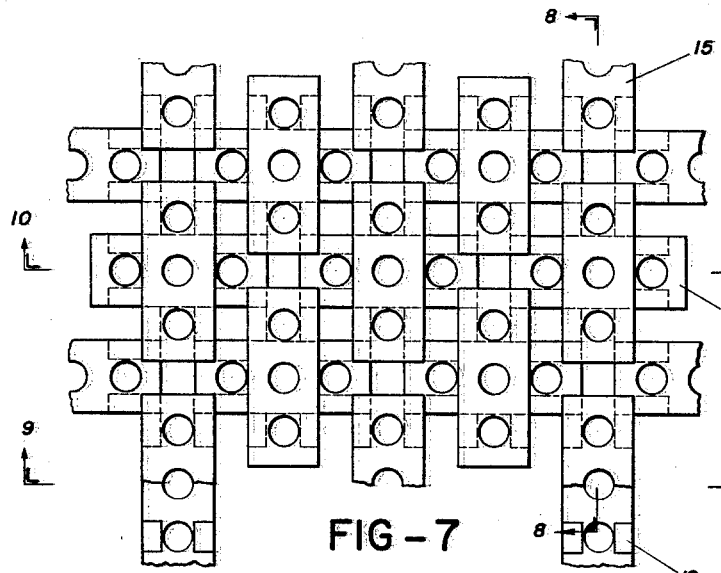
Figure 8:
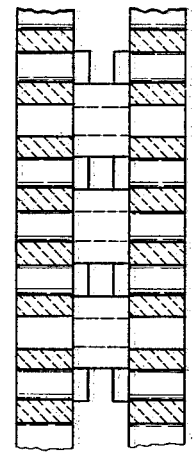
Figure 9:
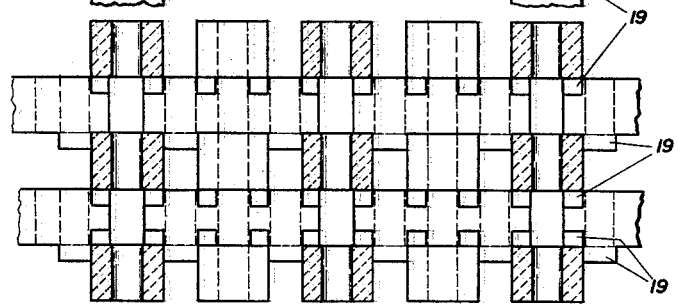
Figure 10:
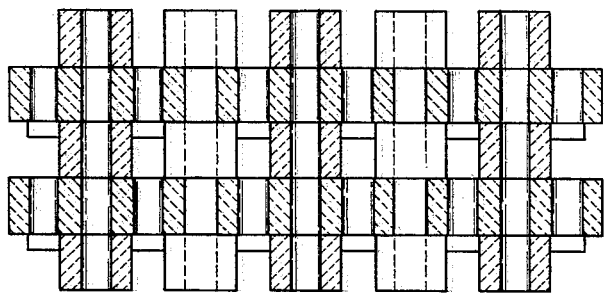
Figure 11:
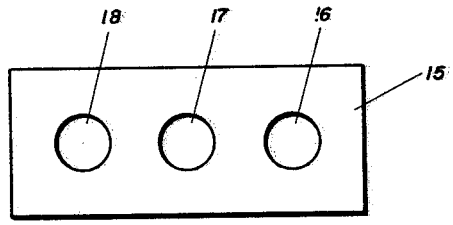
Figure 12:
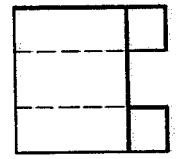
Figure 13:
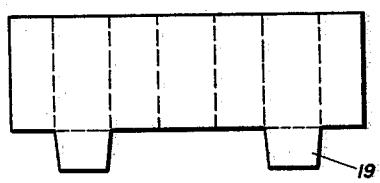
Figure 15:
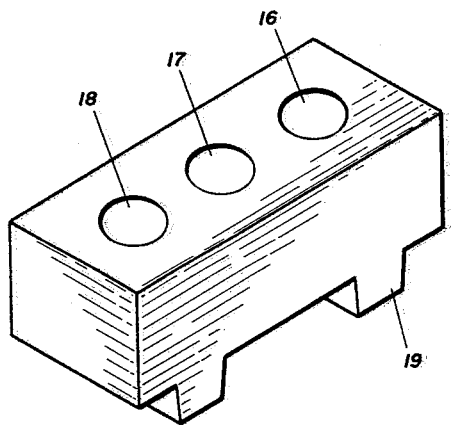
Figure 14:
Figure 16:
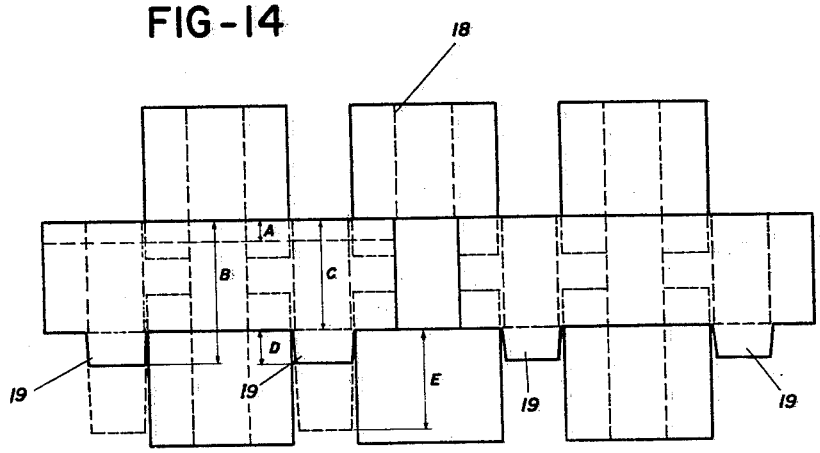
Figure 17:
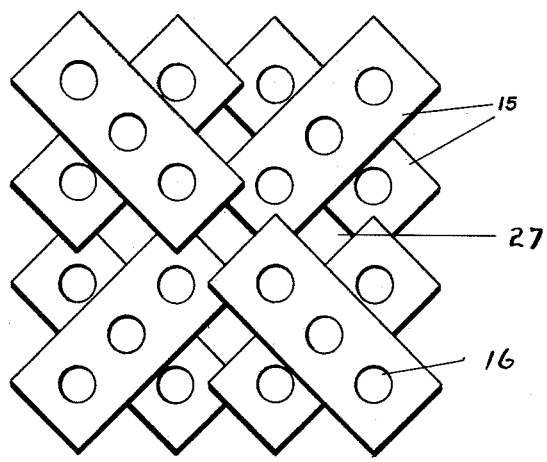
Figure 18:
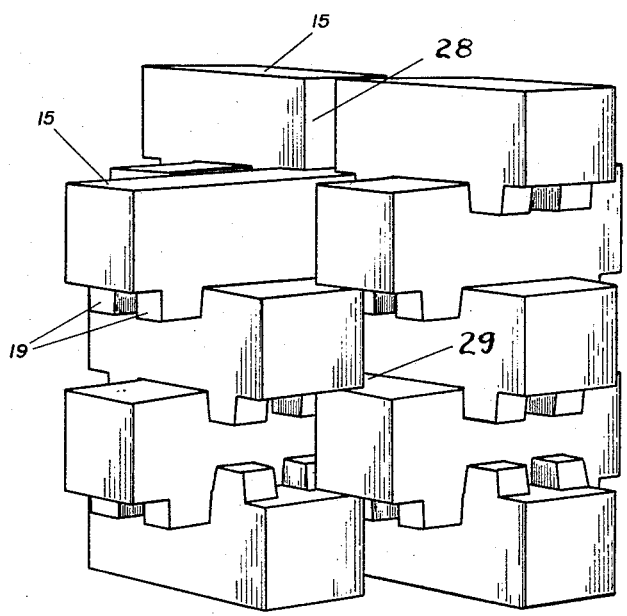

The invention will become more apparent from a consideration of the accompanying drawings constituting a part hereof in which like reference characters designate like parts and in which:

FIGURE 1 is a vertical cross section of a hot blast stove with checkerwork embodying the principles of this invention;

FIGURE 2 a horizontal cross section taken along the line 2—2 of FIGURE 1;

FIGURE 3 a top plan view of a checkertile assembly;

FIGURE 4 an end elevation taken along the line 4—4, FIGURE 3;

FIGURE 5 a side elevation taken along the line 5—5, FIGURE 3;

FIGURE 6 a cross section taken along the line 6—6, FIGURE 3;

FIGURE 7 a top plan view of a checkertile with a checker staggered in a different manner than shown in FIGURE 3;

FIGURE 8 a cross section taken along the line 8—8, FIGURE 7;

FIGURE 9 a cross section taken along the line 9—9, FIGURE 7;

FIGURE 10 a cross section taken along the line 10—10, FIGURE 7;

FIGURE 11 a top plan view of a checkerbrick embodying the principles of this invention;

FIGURE 12 an end elevational view thereof;

FIGURE 13 a side elevational view;

FIGURE 14 a bottom plan view;

FIGURE 15 a view in perspective of the checkerbrick shown in FIGURES 11 to 14;

FIGURE 16 a diagrammatic view illustrating possible variations in the design of body and lugs in the checkerbrick shown in FIGURES 11 through 15;

FIGURE 17 a top plan view of a checkertile assembly showing the square flue openings created by the crossing of the tile; and, FIGURE 18 a view in perspective of the assembly of the regular tile shown in FIGURES 11 through 15.

Referring to FIGURE 1, the numeral 1 designates the outer housing of a blast furnace stove containing a checkerwork generally designated by the numeral 2, which is built up of checkerbrick, the housing containing a firing chamber 3 having a fuel inlet 4 for directing a burner flame to the bottom of the chamber 3 and having an outlet 5 for directing heated air to the hot blast tuyeres of a blast furnace, for example. The checker structure is supported on steel members 6 and an opening 7 directs the products of combustion which come down the checkerwork to a stack.

In operation, the stove is heated by fuel entering the inlet 4 with the products of combustion going upward towards the roof 8 of the stove from which it is deflected downward into the flues 9 constituted by the checkerwork from which it is drawn downward through the outlet 7. The hot products of combustion heat the checkerwork which is made of refractory kiln burnt clay and upon reversal, cold air is drawn into the opening 7 and drawn upward through the checkerwork to the roof 8 and then deflected through the stove portion to the outlet 5.

In the construction shown in FIGURE 1, a series of openings 11, 12 and 13 are provided for taking off a portion of the hot products of combustion and passing them into the checkerwork 2 at different levels, thereby getting more even temperature throughout the entire refractory mass of the checkerwork. The checker stoves of the type shown in FIGURES 1 and 2 are from 12 to 18' in diameter and from 120 to 130' in height, and while a checkerwork covered by this invention is illustrated as used in hot blast stoves, it is evident that it may be used in regenerators for open hearth furnaces and the like.

The checkertile, per se, is shown in FIGURES 11 through 15 of the drawings and consists of a brick of refractory material 15 having three openings 16, 17 and 18 and lugs 19, there being four lugs extending transversely of the brick to the holes 16 and 18. The brick may be 13" long, 4½" high and the lugs may be 1" with openings 16, 17 and 18 approximately 2" in diameter extending through the thickness dimension of the tile. As shown in FIGURE 3, for example, the tile may be arranged with the bottom row of tile designated by the numeral 20 uniformly spaced and the next adjacent layer designated by the numeral 21 may be spaced on the rows of tile 20 with the lugs 19 disposed between the rows 20 to maintain the holes 16, 17 and 18 in vertical alignment to constitute long flues extending the full length of the checkerwork. The second row of tile 21 has its lugs downward while the bottom layer has them extending up vertically, as is more clearly shown in FIGURE 9 of the drawings. From there on up to the top of the checkerwork, all of the lugs 19 are depending in a downward direction.

Because the checkerbrick is adapted for use as a bottom layer, as well as the subsequent upper layers, but a single shape is needed for the entire checker structure unless a damper course is used, as will be hereinafter explained.

In FIGURE 7, the tile is laid with the ends staggered, which sets up channeling in a direction transversely to that shown in FIGURE 3. It should be noted that there are channels in communication with all of the flue openings of the checkerbrick so that there will be a free flow of the hot gases from the heating chamber 3 of the stove throughout the checkerwork structure. It is for this reason that the hot gases may be withdrawn from the heating chamber 3 through the different openings 11 through 13, which can be graduated in size to control the rate of gas flow from the stove to the different levels of the checkerwork, the maximum flow, of course, being at the top. Because of this channeling between the rows of checkerbrick and the flue openings, a maximum refractory surface is exposed for heating and subsequently for giving up the heat to the cold air entering the stove.

More or less refractory mass can be supplied in a given cubicle section by lengthening or shortening the lugs 19 and by varying the thickness of the checkerbrick. This is demonstrated in the diagram of FIGURE 16 wherein the distance D is the normal length of the lug 19 which may, however, be lengthened to a distance shown by E. The dimension C illustrates the thickness of the fire brick which may be varied by reducing it, as shown at A, in proportion to the lengthening of the lug 19. However, by maintaining the dimension C and varying the dimension D, more refractory mass is added to the checkerwork and by reducing the dimension C, the variation due to shrinkage in firing will be reduced correspondingly so that no grinding is necessary to control the height of the checkerbrick in the stove. In other words, where the dimension C is, we will say, "7," it will require double the amount of grinding than in a 3½ or 4" brick, because the variations in shrinkage is double when the brick is burned in the kiln. It will be seen in FIGURE 16 that the lugs 19 are spaced to straddle the width of the brick so that when the tile are interlocked, as they are by arranging them in superposed relation, the flue holes or openings will be maintained in constant alignment.

There is approximately a ⅛" clearance between the lugs 19 and the brick that they straddle, so that each brick within itself has room for expansion without, however, breaking joints or misaligning flue openings. In conventional checker structures, the checkerbrick in any one row abuts the adjacent checkerbrick so that the bricks are severely stressed when they are heated because of lack of room for expansion. This has caused severe crushing and breaking of the checkerbrick especially adjacent the top of the stoves where the temperatures are around 2100° F.

Where it is desired to impede the free flow of the hot gases from the top and the cold air from the bottom through the checkertile, damper courses may be laid, say every 10 or 20' of the height of the checkertile. Such damper courses could utilize any type of checkerbrick that would block off a portion of the holes 16, 17 and 18.

If such a damper course is employed every ten or more feet, or in conjunction with the openings 11, 12 and 13, FIGURE 1, substantial uniformity of heat distribution throughout selected areas of the checkerwork can be maintained. Because of the open channel flow and the flue openings, the checkertile lends itself to an efficient exchange of heat to supply adequate volume of hot air to the hot blast of a blast furnace or to the burners of an open hearth furnace. Again referring to FIGURE 11 of the drawing, it will be noted that the wall section between the holes and from the holes to the edges of the tile are substantially uniform.

As shown in FIGURE 17 of the drawing, the crossing of the checkerbrick 15 in a checkertile work results in the formation of square openings 27 which constitute vertical flues in addition to the round flue openings of the checkertile, and these square flues are in communication with the horizontal channels between the tile such as is shown at 28 and 29 in FIGURE 18 of the drawing. The channels running transversely of each other are of the width corresponding to the depending lugs 19. Again with reference to FIGURE 16 of the drawing, it will be seen from FIGURE 18 that by lengthening the lugs 19 to the dimension E, FIGURE 16, for example, the channels will be much smaller and the hot gases will not flow so freely through the checkertile. By this variation of the length of lug and thickness of the brick body, a checkertile structure can be tailored to comply with precise engineering requirements for handling a given volume of hot gases and air, in accordance with the needs of the furnace to which the hot air is supplied.

Although one embodiment of the invention has been herein illustrated and described, it will be evident to those skilled in the art that various modifications may be made in the details of construction without departing from the principles herein set forth.

I claim:

1. A checkerwork structure for regenerators and the like comprising a plurality of superposed rows of identical brick-shaped refractory bodies, each having a plurality of flue openings and each having two pairs of spacing lugs extending axially of said flue openings from one side of said bodies, each pair of said lugs being adjacent a respective one of said flue openings and having their juxtaposed faces in alignment with and terminating at the edge of said one flue opening, and one pair of said lugs being spaced from the other pair a distance to straddle the width of an identical brick-shaped body therebelow and said flue openings being uniformly longitudinally spaced from each other and from the edges of said brick-shaped bodies to provide wall sections of substantially uniform thickness along the longitudinal and transverse axis of said openings.

2. A checkerwork structure as set forth in claim 1 in which each refractory body has a central and two end flue openings in a row and the pairs of spacing lugs are adjacent the respective end openings.

References Cited in the file of this patent

UNITED STATES PATENTS

| | | |
|---|---|---|
| 1,721,938 | Amsler | July 23, 1929 |
| 2,451,392 | Kennedy | Oct. 12, 1948 |
| 2,651,515 | Agnew et al. | Sept. 8, 1953 |

FOREIGN PATENTS

| | | |
|---|---|---|
| 204,214 | Germany | July 27, 1907 |
| 372,632 | Great Britain | May 12, 1932 |